(12) United States Patent
Miller

(10) Patent No.: US 10,262,539 B2
(45) Date of Patent: Apr. 16, 2019

(54) INTER-VEHICLE WARNINGS

(71) Applicant: Ford Global Technologies, LLC, Dearborn, MI (US)

(72) Inventor: Kenneth J. Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 15/380,580

(22) Filed: Dec. 15, 2016

(65) Prior Publication Data

US 2018/0174458 A1    Jun. 21, 2018

(51) Int. Cl.
   *G08G 1/16* (2006.01)
   *B60W 30/095* (2012.01)

(52) U.S. Cl.
   CPC ........... *G08G 1/163* (2013.01); *B60W 30/095* (2013.01); *G08G 1/166* (2013.01); *G08G 1/167* (2013.01)

(58) Field of Classification Search
   CPC ......... G08G 1/163; G08G 1/166; G08G 1/167
   See application file for complete search history.

(56) References Cited

U.S. PATENT DOCUMENTS

| | | | |
|---|---|---|---|
| 6,351,211 B1 | 2/2002 | Bussard | |
| 7,209,050 B2 | 4/2007 | Corcoran, III | |
| 7,295,925 B2 * | 11/2007 | Breed | B60N 2/2863 340/436 |
| 7,304,589 B2 | 12/2007 | Kagawa | |
| 7,495,550 B2 | 2/2009 | Huang | |
| 7,994,902 B2 | 8/2011 | Avery | |
| 8,229,663 B2 | 7/2012 | Zeng | |
| 8,310,353 B2 | 11/2012 | Hinninger et al. | |
| 8,351,712 B2 | 1/2013 | Lee | |
| 8,520,695 B1 | 8/2013 | Rubin | |
| 8,886,386 B2 | 11/2014 | Merk | |
| 9,129,532 B2 * | 9/2015 | Rubin | G08G 1/166 |
| 9,159,231 B2 | 10/2015 | Noh | |
| 9,487,212 B1 | 11/2016 | Adam | |
| 9,858,817 B1 | 1/2018 | Bletzer | |

(Continued)

FOREIGN PATENT DOCUMENTS

| | | |
|---|---|---|
| CN | 103544850 A | 1/2014 |
| DE | 102004062497 A1 | 7/2006 |

(Continued)

OTHER PUBLICATIONS

Fei Ye, Matthre Adams, and Sumit Roy, V2V Wireless Communication Protocol for Rear-End Collision Avoidance on Highways, University of Washington, Seattle, 2008, http://www.ee.washington.edu/research/funlab/Publications/2008/2008 fei v2v.pdf.

(Continued)

*Primary Examiner* — Calvin Cheung
(74) *Attorney, Agent, or Firm* — Frank Lollo; James P. Muraff; Neal, Gerber & Eisenberg LLP (57) ABSTRACT

A host vehicle includes: motor(s), sensors, processor(s) configured to: (a) iterate a series of future properties, comprising future positions, of nearby first and second vehicles based on determined current properties thereof; (b) associate a blindspot with an iterated future position of the second vehicle; (c) determine whether a future position of the first vehicle occupies the blindspot; (d) if so, transmit a message to the second vehicle including a message activation time.

18 Claims, 6 Drawing Sheets

(56) References Cited

U.S. PATENT DOCUMENTS

| | | | |
|---|---|---|---|
| 2003/0112133 A1 | 6/2003 | Webb | |
| 2005/0012604 A1* | 1/2005 | Takahashi | G01S 13/931 340/435 |
| 2005/0275514 A1* | 12/2005 | Roberts | B60Q 5/00 340/436 |
| 2006/0161315 A1 | 7/2006 | Lewis | |
| 2007/0083318 A1 | 4/2007 | Parikh | |
| 2008/0055066 A1 | 3/2008 | Griffin | |
| 2008/0180238 A1 | 7/2008 | Plummer | |
| 2009/0037088 A1* | 2/2009 | Taguchi | B60W 30/095 701/117 |
| 2009/0058677 A1* | 3/2009 | Tseng | G08C 17/02 340/904 |
| 2009/0167514 A1* | 7/2009 | Lickfelt | G01S 13/87 340/435 |
| 2009/0201173 A1* | 8/2009 | Okabe | G08G 1/167 340/905 |
| 2009/0248284 A1 | 10/2009 | Yoshioka | |
| 2009/0292459 A1 | 11/2009 | Zuccotti | |
| 2010/0049393 A1* | 2/2010 | Emam | G08G 1/161 701/31.4 |
| 2010/0114467 A1 | 5/2010 | Samuel | |
| 2010/0214085 A1 | 8/2010 | Avery | |
| 2013/0147615 A1 | 6/2013 | Chen | |
| 2013/0223686 A1* | 8/2013 | Shimizu | G08G 1/166 382/103 |
| 2013/0238181 A1* | 9/2013 | James | B60W 50/0097 701/23 |
| 2013/0279392 A1 | 10/2013 | Rubin | |
| 2013/0279491 A1* | 10/2013 | Rubin | G08G 1/166 370/347 |
| 2014/0244068 A1* | 8/2014 | Dariush | G08G 1/166 701/1 |
| 2014/0267726 A1* | 9/2014 | Lin | G08G 1/167 348/148 |
| 2014/0365104 A1 | 12/2014 | Sasaki | |
| 2015/0046058 A1* | 2/2015 | Nagata | B60T 7/22 701/93 |
| 2015/0081202 A1 | 3/2015 | Levin | |
| 2015/0149019 A1 | 5/2015 | Pilutti | |
| 2015/0287323 A1 | 10/2015 | Wells | |
| 2015/0353078 A1* | 12/2015 | Kaminade | G01S 13/06 701/1 |
| 2015/0381751 A1 | 12/2015 | Haran | |
| 2016/0036917 A1 | 2/2016 | Koravadi | |
| 2016/0133130 A1 | 5/2016 | Grimm | |
| 2016/0242223 A1 | 8/2016 | Brahmi | |
| 2016/0264045 A1 | 9/2016 | Ng-Thow-Hing | |
| 2017/0032402 A1* | 2/2017 | Patsiokas | G06Q 30/0266 |
| 2017/0053530 A1* | 2/2017 | Gogic | H04W 4/046 |
| 2017/0066374 A1* | 3/2017 | Hoye | G08B 21/06 |
| 2017/0101092 A1* | 4/2017 | Nguyen Van | B60W 30/09 |
| 2017/0162042 A1* | 6/2017 | Dooley | G08G 1/04 |
| 2017/0243485 A1 | 8/2017 | Rubin | |
| 2018/0052458 A1* | 2/2018 | Tsuji | G05D 1/0061 |

FOREIGN PATENT DOCUMENTS

| | | |
|---|---|---|
| DE | 102014007452 A1 | 11/2015 |
| JP | 2006185136 A | 12/2004 |
| JP | 4684960 B2 | 1/2008 |
| JP | 2008015920 B2 | 1/2008 |
| JP | 2010086269 A | 4/2010 |
| JP | 4499525 B2 | 7/2010 |
| JP | 2011250021 A | 12/2011 |
| KR | 1020160144666 A | 12/2016 |
| WO | WO 2015/126318 A1 | 8/2015 |
| WO | WO 2016/081488 A1 | 5/2016 |

OTHER PUBLICATIONS

Core System Requirements Specification (SyRS), RITA—Intelligent Transportation Systems Joint Program Office, Jun. 13, 2011, Revision A, www.its.dot.gov/index.htm.

Search Report dated Jul. 4, 2017 for Great Britain Patent Application No. GB 1700254.4 (6 Pages).

Search Report dated Jun. 13, 2018 for Great Britain Patent Application No. GB 1720809.1 (4 Pages).

* cited by examiner

INTER-VEHICLE WARNINGS

TECHNICAL FIELD

This disclosure relates to, among other things, transmitting messages related to blind-spot warnings.

BACKGROUND

Vehicles typically include a C-pillar obstructing view of adjacent lanes, thus producing blind spot zones. There is a need to transmit a preemptive warning to vehicles when another vehicle is expected to occupy one of the blind spot zones. Such a preemptive warning will improve safety by alerting a driver that a vehicle will soon occupy one of the blind spots.

SUMMARY

Disclosed is a host vehicle including: motor(s), sensors, processor(s) configured to: (a) iterate a series of future properties, comprising future positions, of nearby first and second vehicles based on determined current properties thereof; (b) associate a blindspot with an iterated future position of the second vehicle; (c) determine whether a future position of the first vehicle occupies the blindspot; (d) if so, transmit a message to the second vehicle including a message activation time.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present, as one option, and mutually exclusive alternatives as another option. In other words, the conjunction "or" should be understood to include "and/or" as one option and "either/or" as another option.

Figure 1:
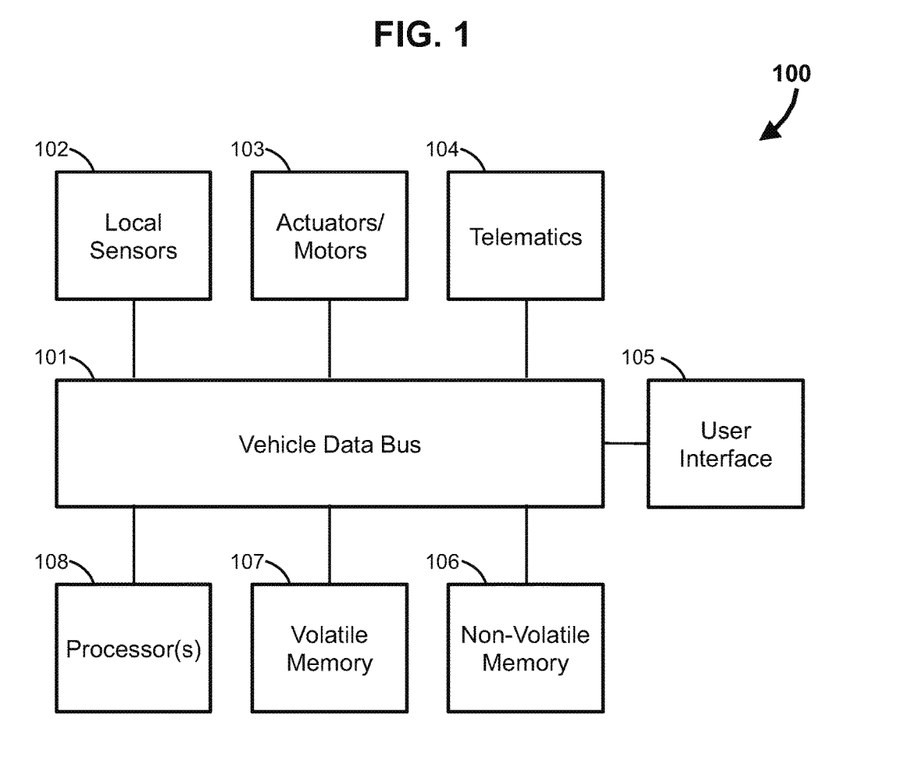
FIG. 1 is a block diagram of a vehicle computing system.

FIG. 1 shows a computing system 100 of host vehicle 200. Host vehicle 200 is connected, meaning that host vehicle 200 is configured to (a) receive wireless data from external entities (e.g., infrastructure, servers, other connected vehicles) and (b) transmit wireless data to external entities. Host vehicle 200 may be autonomous, semi-autonomous, or manual. Host vehicle 200 includes a motor, a battery, at least one wheel driven by the motor, and a steering system configured to turn the at least one wheel about an axis. Host vehicle 200 may be fossil fuel powered (e.g., diesel, gasoline, natural gas), hybrid-electric, fully electric, fuel cell powered, etc.

Vehicles are described, for example, in U.S. patent application Ser. No. 15/076,210 to Miller, U.S. Pat. No. 8,180,547 to Prasad, U.S. patent application Ser. No. 15/186,850 to Lavoie, and U.S. patent application Ser. No. 14/972,761 to Hu, all of which are hereby incorporated by reference in their entireties. Host vehicle 200 may include any of the features described in Miller, Prasad, Lavoie, and Hu.

Computing system 100 resides in host vehicle 200. Computing system 100, among other things, enables automatic control of mechanical systems within host vehicle 200 and facilitates communication between host vehicle 200 and external entities (e.g., connected infrastructure, the Internet, other connected vehicles). Computing system 100 includes a data bus 101, one or more processors 108, volatile memory 107, non-volatile memory 106, user interfaces 105, a telematics unit 104, actuators and motors 103, and local sensors 102.

Data bus 101 traffics electronic signals or data between the electronic components. Processor 108 performs operations on electronic signals or data to produce modified electronic signals or data. Volatile memory 107 stores data for near-immediate recall by processor 108. Non-volatile memory 106 stores data for recall to the volatile memory 107 and/or the processor 108. Non-volatile memory 106 includes a range of non-volatile memories including hard drives, SSDs, DVDs, Blu-Rays, etc. User interface 105 includes displays, touch-screen displays, keyboards, buttons, and other devices that enable user interaction with the computing system. Telematics unit 104 enables both wired and wireless communication with external entities via Bluetooth, cellular data (e.g., 3G, LTE), USB, etc.

Actuators/motors 103 produce tangible results. Examples of actuators/motors 103 include fuel injectors, windshield wipers, brake light circuits, transmissions, airbags, motors mounted to sensors (e.g., a motor configured to swivel a local sensor 102), engines, power train motors, steering, blind spot warning lights, etc.

Local sensors 102 transmit digital readings or measurements to processors 108. Examples of local sensors 102 include temperature sensors, rotation sensors, seatbelt sensors, speed sensors, cameras, lidar sensors, radar sensors, infrared sensors, ultrasonic sensors, clocks, moisture sensors, rain sensors, light sensors, etc. It should be appreciated that any of the various electronic components of FIG. 1 may include separate or dedicated processors and memory. Further detail of the structure and operations of computing system 100 is described, for example, in Miller, Prasad, Lavoie, and Hu.

Figure 2:
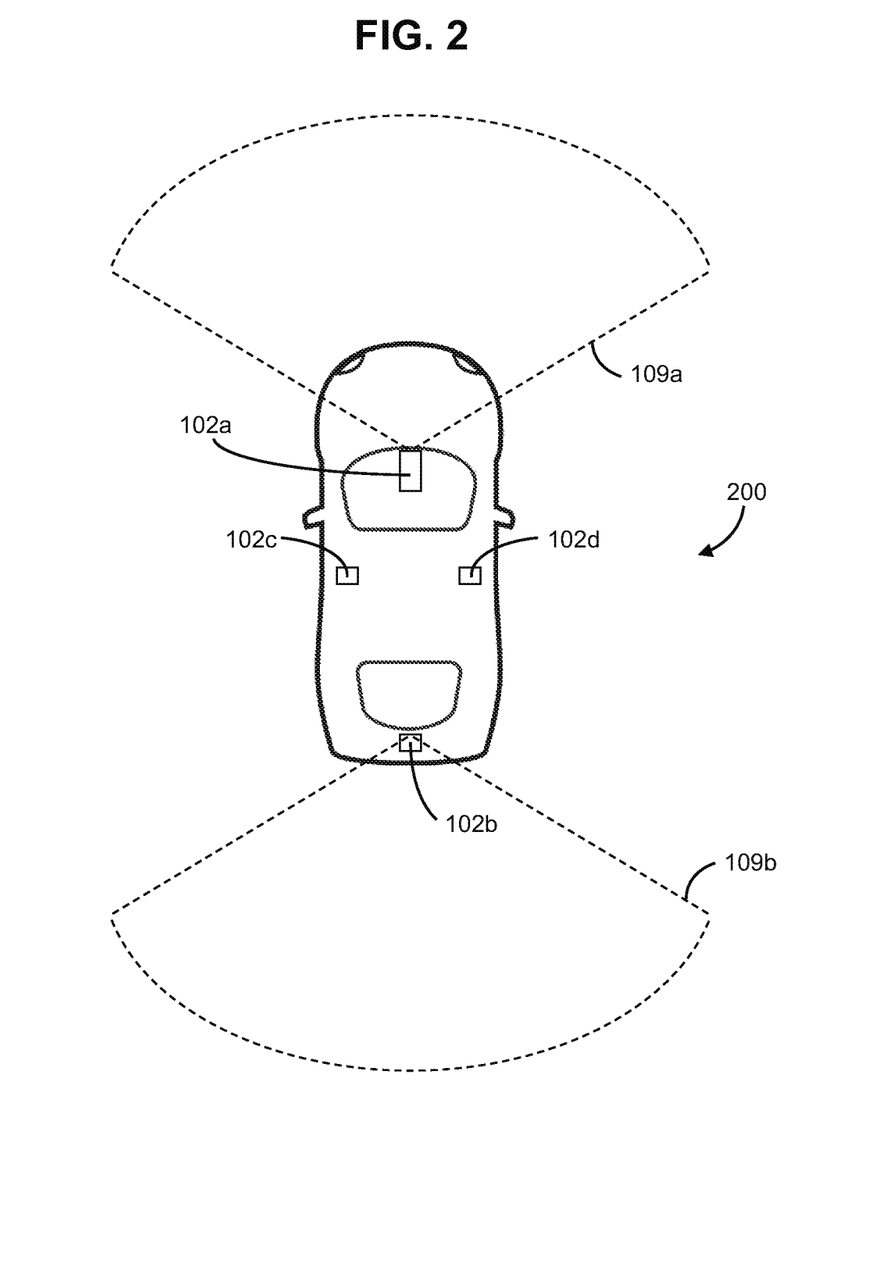
FIG. 2 is a top plan view of a host vehicle including the vehicle computing system.

FIG. 2 generally shows and illustrates host vehicle 200, which includes computing system 100. Some of the local sensors 102 are mounted on an exterior of host vehicle 200

(others are located inside the vehicle 200). Local sensor 102a is configured to detect objects leading the vehicle 200. Local sensor 102b is configured to detect objects trailing the vehicle 200 as indicated by trailing sensing range 109b. Left sensor 102c and right sensor 102d are configured to perform similar functions for the left and right sides of the vehicle 200.

As previously discussed, local sensors 102a to 102d may be ultrasonic sensors, lidar sensors, radar sensors, infrared sensors, cameras, microphones, and any combination thereof, etc. Host vehicle 200 includes a plurality of other local sensors 102 located in the vehicle interior or on the vehicle exterior. Local sensors 102 may include any or all of the sensors disclosed in Miller, Prasad, Lavoie, and Hu.

Host vehicle 200 may include a blind spot warning system, as is known in the art. A blind spot warning system detects when an external vehicle occupies a certain zone with respect to host vehicle, the zone being predetermined at the time of manufacturing and representing a blind spot of host vehicle 200. When an external vehicle occupies the certain zone, host vehicle 200 may (a) activate one or more dedicated blind spot warning lights located on host vehicle dash, (b) display a message on a host vehicle display, and/or (c) control steering to prevent host vehicle 200 from changing lanes and colliding with the external vehicle.

It should be appreciated that host vehicle 200 is configured to perform the methods and operations described herein. In some cases, host vehicle 200 is configured to perform these functions via computer programs stored on volatile 107 and/or non-volatile 106 memories of computing system 100.

One or more processors are "configured to" perform a disclosed method step, block, or operation, at least when at least one of the one or more processors is in operative communication with memory storing a software program with code or instructions embodying the disclosed method step or block. Further description of how processors, memory, and software cooperate appears in Prasad. According to some embodiments, a mobile phone or an external server in operative communication with host vehicle 200 perform some or all of the methods and operations discussed below.

According to various embodiments, host vehicle 200 includes some or all of the features of vehicle 100a of Prasad. According to various embodiments, computing system 100 includes some or all of the features of VCCS 102 of FIG. 2 of Prasad. According to various embodiments, host vehicle 200 is in communication with some or all of the devices shown in FIG. 1 of Prasad, including nomadic or mobile device 110, communication tower 116, telecom network 118, Internet 120, and data processing center 122. Each of the entities described in this application (e.g., the connected infrastructure, the other vehicles, mobile phones, servers) may share any or all of the features described with reference to FIGS. 1 and 2.

The term "loaded vehicle," when used in the claims, is hereby defined to mean: "a vehicle including: a motor, a plurality of wheels, a power source, and a steering system; wherein the motor transmits torque to at least one of the plurality of wheels, thereby driving the at least one of the plurality of wheels; wherein the power source supplies energy to the motor; and wherein the steering system is configured to steer at least one of the plurality of wheels." Host vehicle 200 may be a loaded vehicle.

The term "equipped electric vehicle," when used in the claims, is hereby defined to mean "a vehicle including: a battery, a plurality of wheels, a motor, a steering system; wherein the motor transmits torque to at least one of the plurality of wheels, thereby driving the at least one of the plurality of wheels; wherein the battery is rechargeable and is configured to supply electric energy to the motor, thereby driving the motor; and wherein the steering system is configured to steer at least one of the plurality of wheels." Host vehicle 200 may be an equipped electric vehicle.

Figure 3:
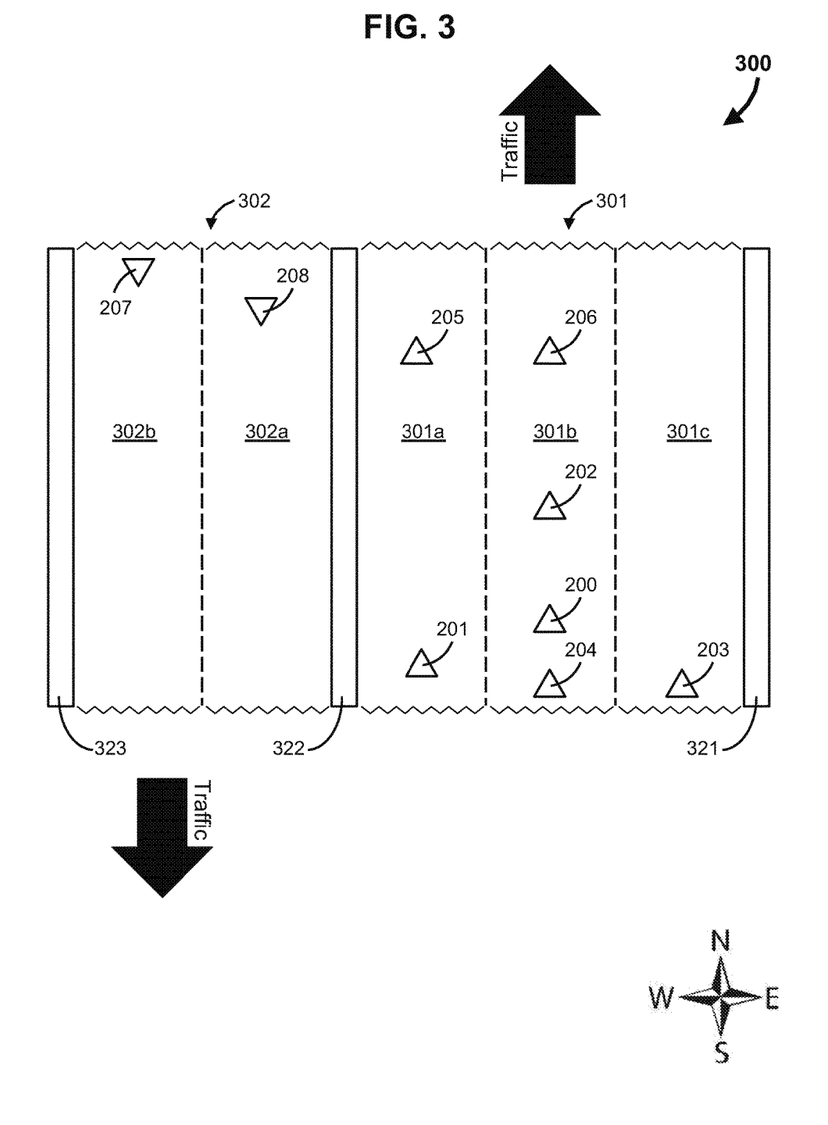
FIG. 3 is a schematic of a road at a point in time.

With reference to FIG. 3, road 300 includes inbound lanes 301 and outbound lanes 302. Inbound lanes 301 are defined between a first divider and a second divider 322. Inbound lanes 301 include a first inbound lane 301a, a second inbound lane 301b, and a third inbound lane 301. Traffic in inbound lanes 301 flows North. Outbound lanes 302 are defined between second divider 322 (also known as a median) and a third divider 323. Outbound lanes 302 include a first outbound lane 302a and a second outbound lane 302b. Traffic in outbound lanes 302 flows South. The dividers 321, 322, 333 may be grass, concrete, painted lines, etc. Adjacent lanes are separated by painted lines (shown, but not labeled).

Host vehicle 200, first vehicle 201, second vehicle 202, third vehicle 203, fourth vehicle 204, fifth vehicle 205, and sixth vehicle 206 are traveling North on inbound lanes 301. Seventh vehicle 207 and eight vehicle 208 are traveling South on outbound lanes 302. As stated above, first, second, third, fourth, fifth, sixth, seventh, and eighth vehicles 201 to 208 may be configured to include some or all of the features of host vehicle 200. Thus, some or all of the vehicles 200 to 208 may be configured to perform the operations disclosed in the present application. At least some of first to eighth vehicles 201 to 208 may be legacy (i.e., unconnected or standard) vehicles.

Figure 4:
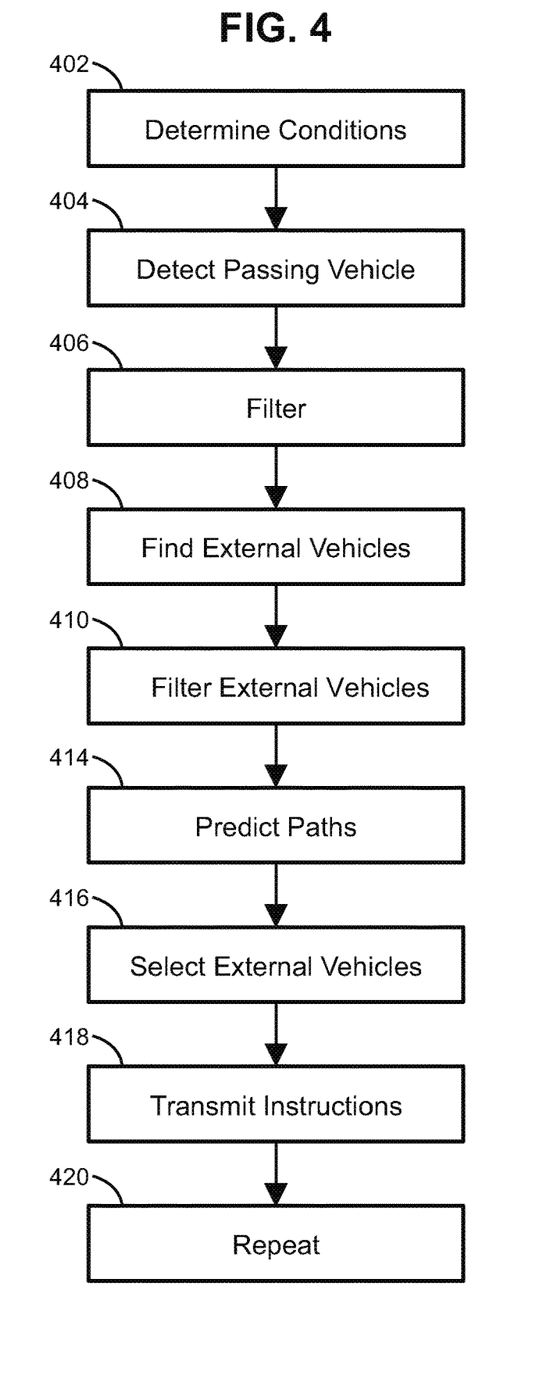
FIG. 4 is a block diagram of a method.

With reference to FIG. 4, host vehicle 200 may be configured to determine whether one vehicle (e.g., first vehicle 201) will occupy a blind spot of another vehicle (e.g., second vehicle 202). Upon such a determination, host vehicle 200 may instruct either the another vehicle (e.g., second vehicle 202) or a proxying vehicle (e.g., sixth vehicle 206) to provide a blind spot warning.

At block 402, host vehicle 200 determines various conditions, which include one or more of: (a) host vehicle properties (including position, lane, velocity (which includes heading), acceleration), (b) road properties (including road curvature, number of aligned lanes, posted speed limit, weather conditions), and/or (c) external vehicle properties (including position, lane, velocity, acceleration). Aligned lanes are lanes carrying traffic in the same direction as host vehicle 200 (e.g., inbound lanes are aligned lanes host vehicle 200 is inbound and outbound lanes are aligned lanes when host vehicle 200 is outbound).

Host vehicle 200 may measure host vehicle velocity via speed and orientation sensors of host vehicle 200. Host vehicle 200 may determine the current road with reference to a GPS location of host vehicle 200 and a base map, which may be received from an external server and include coordinates of road boundaries and lane boundaries. The base map may include the number of inbound and outbound lanes for each road. By referring to the base map, host vehicle 200 may determine the number of aligned lanes and the positions thereof based on host vehicle heading and/or host vehicle GPS coordinates. Host vehicle 200 may determine the current lane by comparing current GPS coordinates to lane boundary coordinates. The base map may be a component of the traffic map (discussed below).

Weather conditions may be determined via local sensors 102 (e.g., moisture sensors, rain sensors, light sensors, clocks) and/or via downloads from an external sever (e.g., a weather server). Host vehicle 200 may determine posted or nominal speed limit of the current lane with reference to the base map, which may provide nominal or posted speed limits for each road lane. In some cases, the base map will post speed limits by road or road section, which may be applied to each of the lanes.

At block 404, a passing vehicle (also called a subject vehicle) is detected via local sensors 102 or via the traffic map, discussed below. A passing vehicle may and/or must (a) have a speed greater than host vehicle speed, (b) occupy a lane adjacent to host vehicle lane, (c) be within a predetermined distance of host vehicle position, (d) have a speed exceeding the posted speed limit, and/or (e) have a speed exceeding an average traffic flow speed by a predetermined amount. Block 404 includes determining properties of the passing vehicle including position, velocity, acceleration, lane, etc. According to one embodiment, host vehicle 200 is considered to be the passing vehicle.

At block 406, a filter is applied to the passing vehicle. The filter may compare passing speed (i.e., speed of the passing vehicle) to posted speed limit. If the passing speed is below the posted speed limit, then host vehicle 200 may return to block 402. If the passing speed exceeds to posted speed limit, then host vehicle 200 may proceed to block 408. Alternatively or in addition, the first filter may determine whether the passing vehicle is legacy (i.e., standard) or connected (i.e., V2X or equipped). Such a determination is described in Miller. If the passing vehicle is legacy or standard then host vehicle 200 may proceed to block 408. If the passing vehicle is connected, V2X, or equipped then host vehicle 200 may return to block 402. As stated above, host vehicle 200 may be configured to perform some or all of the operations disclosed in Miller.

Alternatively, host vehicle 200 may skip blocks 404 and 406. According to these embodiments, host vehicle 200 considers each vehicle detected during blocks 402 and 408 to be a passing vehicle (i.e., a potential passing vehicle) and thus perform the operations of FIG. 4 assuming that each detected vehicle (including host vehicle 200) is a potentially passing vehicle. According to this embodiment, blind spot instructions may be generated and transmitted even when no vehicle is passing host vehicle 200.

At block 408, host vehicle 200 detects external vehicles. External vehicles are vehicles located within a predetermined distance ahead of host vehicle 200 and/or the passing vehicle and occupying an aligned lane. According to some embodiments, host vehicle 200 may label all vehicles within a predetermined distance of host vehicle 200 as external vehicles (including vehicles trailing host vehicle 200).

The above-mentioned predetermined distances may be based on (a) posted speed limit, (b) the passing speed, (c) average speed of aligned vehicles within a predetermined distance host vehicle 200, and/or (d) average speed of the vehicle group. The detection of external vehicles may be performed with local sensors 102 and/or with reference to a traffic map of vehicles. One such traffic map (also called a traffic plan) is disclosed in Miller with reference to FIG. 8. As stated above, the traffic map or traffic plan may include the base map.

At block 410, host vehicle 200 may filter external vehicles. For example, host vehicle 200 may filter external vehicles to exclude external vehicles occupying that are neither in the lane of the passing vehicle nor a lane directly adjacent thereto. If, as stated above, host vehicle 200 is applying the operations while assuming that each vehicle is a potentially passing vehicle, then host vehicle 200 may skip block 410.

As stated above, at least two embodiments have been disclosed: According to the first embodiment, host vehicle 200 predicts whether a specific passing vehicle will occupy future blind spot zones of filtered external vehicles and host vehicle. The combination of the filtered forward vehicles, host vehicle, and the specific passing vehicle is referred to as a vehicle group. According to the second embodiment, host vehicle 200 predicts whether host vehicle 200 and determined external vehicles will occupy a blind spot zone of host vehicle 200 or any determined external vehicles. The combination of host vehicle 200 and the external vehicles is also referred to as a vehicle group.

At block 414, host vehicle 200 predicts paths for each vehicle in the vehicle group. The one or more paths are based on the received properties (position, velocity (including heading), acceleration of each vehicle and road properties (e.g., curvature of each lane, posted speed limit, weather conditions). During path projection, host vehicle 200 may assume that (a) no vehicle can collide with another vehicle, (b) each vehicle continues to follow the curvature of its current lane, and (c) directly leading and trailing vehicles are spaced by a minimum gap, sized according to velocity of the directly leading vehicle.

Host vehicle 200 may predict the paths via iterations, each of the iterations corresponding to a future point in time. The first iteration may depend on the current properties of the vehicles in the vehicle group. The second iteration may depend on the properties predicted during the first iteration.

For each of the iterated positions of each vehicle in the vehicle group, host vehicle 200 may determine a blind spot zone. The blind spot zones may have a predetermined geometry, calculated based on factors that are discussed below with reference to FIG. 5. The blind spot zones may be based on received properties of the vehicles (e.g., model).

Blind spot zones are referred to as being "occupied." Thus, when one vehicle occupies another vehicle's blind spot zone, an "occupation" has occurred. The vehicle that occupies the blind spot zone is the "occupying" vehicle. That vehicle whose blind spot zone is being occupied is the "occupied" vehicle. "Occupation start time" refers to a first moment in time when occupation has occurred.

The amount or degree of intrusion of the occupying vehicle into the blind spot zone may be predetermined. For example, when 2% of a vehicle intrudes into a blind spot zone, no occupation may be determined to occur. Alternatively, when any portion of a vehicle intrudes into a blind spot zone, an occupation may be determined to occur. The amount of intrusion necessary to determine an occupation may be calculated based on a speed of (a) the occupying vehicle and/or (b) the occupied vehicle at an iteration prior to the occupation.

Figure 5:
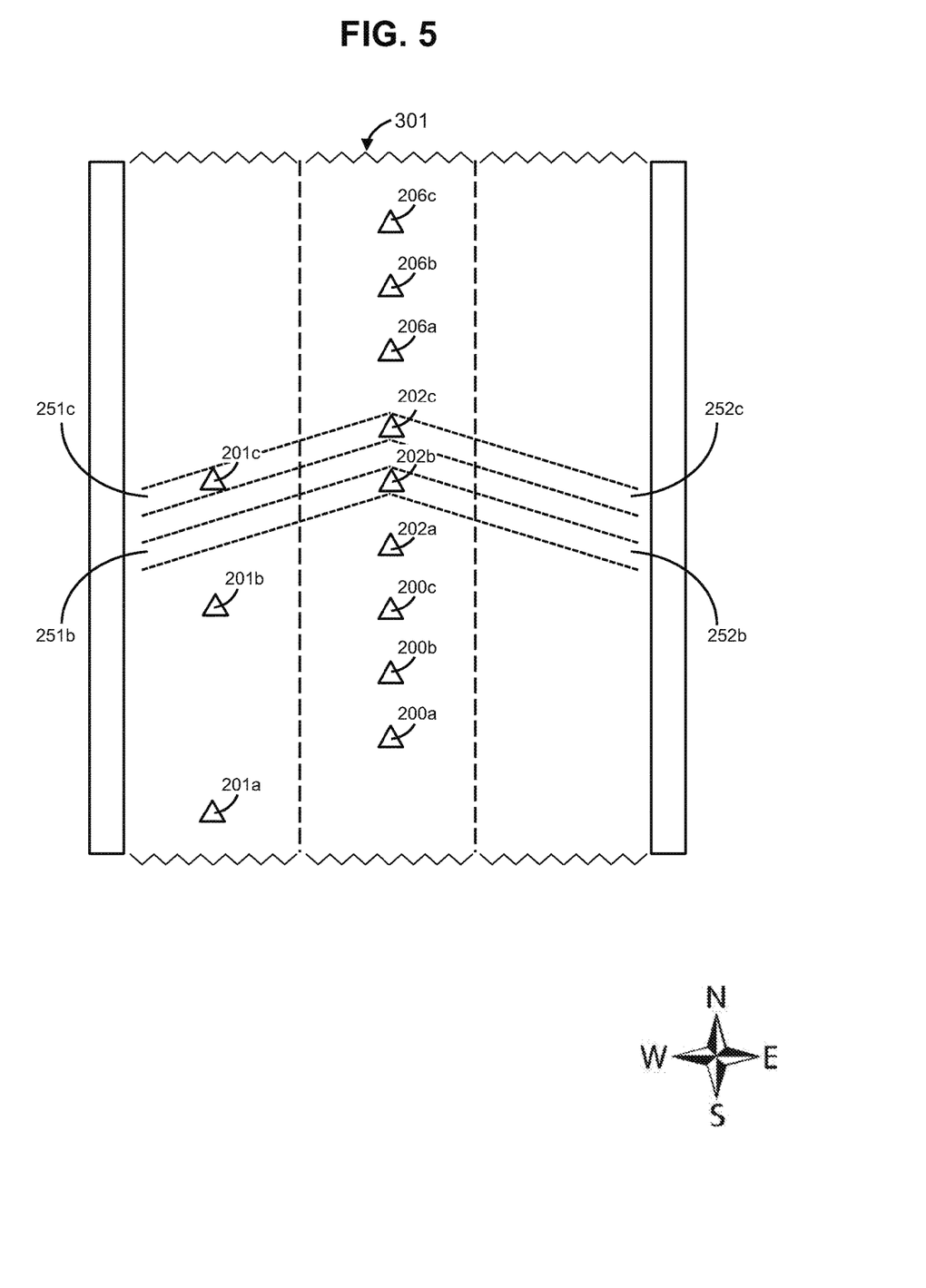
FIG. 5 is a schematic of the road at three different points in time.

With reference to FIG. 5, first vehicle 201 has a current position 201a, a first predicted position 201b at a first future point in time, and a second predicted position 201c at a second future point in time. The difference between the second future point in time and the first future point in time is the resolution of the iteration. To generate the predicted path of first vehicle 201, host vehicle 200 connects each of the positions 201a, 201b, 201c with a continuous line (not shown).

An occupation may occur along the continuous line, but between iterations. The predicted occupation start time may be thus found via interpolation between the two iterations.

To conserve processing resources, host vehicle 200 may only generate a path for each vehicle in the group until (a) the vehicle is a predicted to be a predetermined minimum distance away from host vehicle 200 at a future point in time, and/or (b) a maximum timespan has been reached (i.e., a maximum number of iterations have been performed).

The maximum timespan may be calculated based on an average velocity of the vehicle group. A resolution of the iterations (i.e., a future time difference between each iteration—not a time that it takes for host vehicle 200 to perform the iterations) may be inversely related to a total number of vehicles for which host vehicle 200 is predicting paths.

For example, if the maximum timespan is 3 seconds and the iteration resolution is 1 second, then a maximum of three iterations are performed. If the maximum timespan is 6 seconds and the iteration resolution is 0.5 seconds, then a maximum of six iterations are performed.

As a further example, if host vehicle 200 is predicting paths for ten vehicles (including host vehicle 200), then the resolution may be low and the future time difference between iterations may be 0.5 seconds. If host vehicle 200 is predicting paths for three vehicles (including host vehicle 200), then the resolution may be high and the future time difference between iterations may be 0.2 seconds. Thus, with reference to FIG. 5, the future time difference between positions 201c and 201b may be 0.5 seconds (when the resolution is low) or 0.2 seconds (when the resolution is high).

Host vehicle 200 may generate each path in parallel, such that host vehicle 200 predicts properties at a first point in time for each vehicle in the vehicle group (i.e., a first iteration), then properties at a second point in time for each vehicle in the vehicle group based on the properties at the first point in time (i.e., a second iteration), etc. Put differently, host vehicle 200 may predict properties of each vehicle in the vehicle group at one point in time before iterating properties of each vehicle at a later point in time. As explained above, a difference between the time associated with one iteration and the time associated with a subsequent iteration is the resolution.

At block 416, and according to the first embodiment, host vehicle 200 determines whether the path (as stated above, the path may be a continuous line connecting the future positions of the considered vehicle) of the passing vehicle occupies any of the future blind spot zones for each vehicle in the vehicle group. If the passing vehicle does occupy one of the blind spot zones, then host vehicle proceeds to block 418.

At block 416, and according to the second embodiment, host vehicle 200 determines whether the path of any vehicle in the vehicle group occupies any of the future blind spot zones of each vehicle in the vehicle group. If such an occupation is predicted, then host vehicle proceeds to block 418.

According to both the first and second embodiments, block 416 may be performed in parallel with block 414 such that upon determining an occupation, host vehicle 200 immediately performs block 418, and then returns to block 414 and continues.

At block 418, host vehicle 200 transmits instructions for the occupied vehicle and/or the occupying vehicle. During this step, host vehicle 200 may determine whether the occupied vehicle is equipped to directly receive transmitted instructions (e.g., whether the intersected vehicle is connected). If the occupied vehicle is equipped to directly receive transmitted instructions, then host vehicle 200 may transmit the instructions directly to the occupied vehicle. If the occupied vehicle is not equipped (e.g., is a legacy or standard vehicle), then host vehicle 200 may proxy the instructions through a vehicle directly leading the occupied vehicle.

The instructions may be display instructions commanding the receiving vehicle to generate a display or warning at a predetermined time. The predetermined time may be based on the predicted occupation start time. The predetermined time may precede the predicted occupation start time by an amount, the amount being positively correlated with a predicted velocity of the occupying vehicle during the iteration (discussed below) immediately preceding the occupation.

The display instructions may be instructions to display certain graphics on a display of the receiving vehicle or to illuminate certain lights in the vehicle interior and/or on the vehicle exterior. When the receiving vehicle is proxying for a legacy or standard vehicle, the display instructions may be instructions to illuminate certain lights on the vehicle exterior, but to not display any graphics or illuminate lights in the vehicle interior. The illuminating instructions may cause the lights to illuminate or flash according to a predetermined sequence.

Display instructions, as opposed to other types of instructions or information (e.g., information predicting the time of occupation of the passing vehicle with the blind spot zone) advantageously reduce processing power needed to interpret the instructions. For example, if a receiving vehicle downloaded each of the predicted paths and properties, then the receiving vehicle would need to analyze such information before generating a warning.

According to one embodiment, the display instructions comprise or consist of: (a) an identifier indicating whether the instructions are to alert the driver of the receiving vehicle (i.e., non-proxy instructions) or whether the instructions are to alert the driver of a trailing vehicle (i.e., proxy instructions), (b) a predicted occupation time, (c) a predicted occupation lane or side, and/or (d) instructions for which displays or lights to activate and at what frequency or pattern the displays or lights should be activated. The receiving vehicle may be configured to apply analyze the display instructions to automatically avoid or alter a lane change into the lane corresponding to the future intersected blind spot zone. According to other embodiments, some or all of the information that has been previously discussed, including coordinates of the predicted occupation, routes of each vehicle in the vehicle group, etc. are sent to the receiving vehicle.

With reference to FIG. 5, host vehicle 200, first vehicle 201, second vehicle 202, and sixth vehicle 206 are traveling northbound on inbound lanes 301. Host vehicle 200 performs the operations of FIG. 4. First vehicle 201 is considered to be the passing or subject vehicle.

At the current time, host vehicle has a first position 200a, first vehicle 201 has a first position 201a, second vehicle 202 has a first position 202a, and sixth vehicle 206 has a first position 206a. Host vehicle 200 projects a sequence of second 200b, 201b, 202b, 206b and third 200c, 201c, 202c, 206c positions for each vehicle 200, 201, 202, 206 based on the current vehicle properties (e.g., position, speed, heading, acceleration), the determined road properties (e.g., posted speed limit, weather, curvature), and vehicle spacing. Each of the positions is associated with properties (e.g., velocity (including heading), acceleration, etc.).

As stated above, host vehicle 200 projects the positions in parallel such that each of second positions 200b, 201b, 202b, 206b are calculated before any of the third positions 200c, 201c, 202c, 206c. Put differently, one iteration of positions (e.g., all of second positions) and the properties associated therewith is calculated before the next iteration of positions.

While calculating an iteration of positions (e.g., while calculating the second properties), host vehicle 200 may take into account spacing between leading and trailing vehicles. More specifically, host vehicle 200 may decrease a velocity and decrease an acceleration, to below zero, of a vehicle approaching another vehicle from behind. Here, properties of second vehicle at 202a include a high velocity and a zero acceleration and properties of sixth vehicle at 206a include a low velocity and a zero acceleration.

Without modification, the distance between second vehicle at 202b and sixth vehicle at 206b would fall below a minimum spacing or tailgating gap (sized based on velocity of sixth vehicle at 206a—put differently, sized based on velocity of the leading vehicle during the previous iteration). Thus, host vehicle 200 assumes that second vehicle 202 will decelerate between 202a and 202b to maintain the minimum gap. The same principles apply to calculation of 202c (i.e., host vehicle 200 may predict properties of second vehicle 202 based on enforcement of a minimum tailgating gap).

As previously discussed, host vehicle 200 projects blind spot zones for each vehicle. At 202b, second vehicle 202 has a left blind spot zone 251b and a right blind spot zone 252b. At 202c, second vehicle 202 has a left blind spot zone 251c and a right blind spot zone 252c. Although the blind spot zones are shown as extending from a leading tip of host vehicle 200, in practice, the blind spot zones will typically extend from points behind the leading tip of host vehicle 200. Furthermore, the blind spot zones, although shown as being defined by two parallel lines, may be defined with any suitable geometry.

According to some embodiments, the total area of a blind spot zone and/or any dimension of a blind spot zone may increase with velocity of the considered vehicle (e.g., the blind spot zones of second vehicle 202 may have a larger area when second vehicle 202 is traveling fast and a smaller area when second vehicle 202 is traveling slow). Thus, blind spot zones 251a and 251b may have different sizes or dimensions. As the velocity increases, the total area of the blind spot zone changes to increase the area of the blind spot zone trailing host vehicle 200 in a lane adjacent to host vehicle 200. Such a feature is further explained below with reference to FIG. 6.

Alternatively or in addition, the total area and/or any dimension of a blind spot zone may be positively correlated with velocity of the closest vehicle(s) trailing the considered vehicle in an adjacent lane (but not the same lane). As the velocity increases, the total area of the blind spot zone changes to increase the area of the blind spot zone trailing host vehicle 200 in the adjacent lane. For example, first vehicle 201 is the closest vehicle trailing second vehicle 202 in an adjacent lane. Thus, left blind spot zone 251b, but not right blind spot zone 252b may be increased or decreased based on velocity of first vehicle 201 at 201a (i.e., velocity of the trailing vehicle during the previous iteration). Such a feature is further explained below with reference to FIG. 6.

Put differently, as the relative closing vehicle speed of the passing vehicle increases relative to the considered vehicle, a length of the blind spot zone of the considered vehicle may be extended further rearward and toward the closest trailing vehicle in the adjacent lane. Such operation enables warning of the driver of the considered vehicle at a greater relative distance. It should thus be appreciated that the blind spot zones may exceed the actual c-pillar blindspot.

Figure 6:
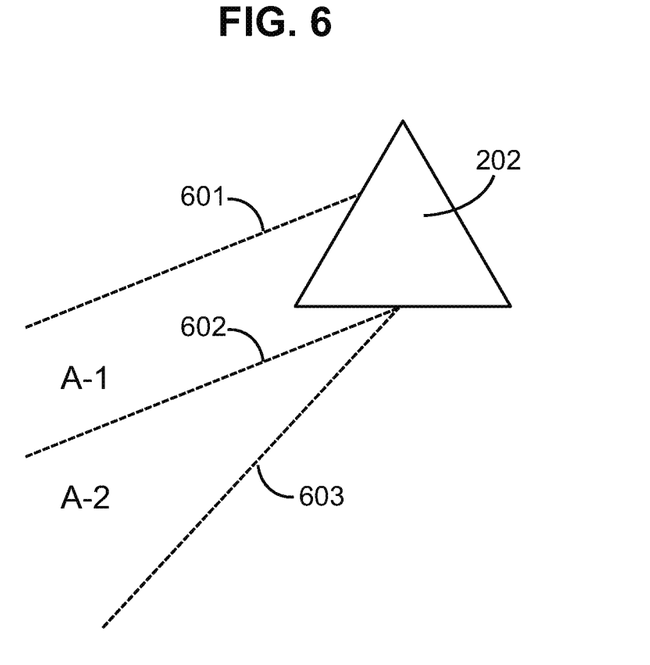
FIG. 6 illustrates a smaller blind spot zone and a larger blind spot zone.

With reference to FIG. 6, host vehicle 200 is configured to project a first blind spot zone A-1 and a second blind spot zone A-1+A-2 for second vehicle 202. First blind spot zone A-1 is defined between lines 601 and 602. Second blind spot zone A-1+A-2 is defined between lines 601 and 603. As described above, a future position of second vehicle 202 may be associated with first blind spot zone A-1 when second vehicle 202 is traveling slowly and/or the closest vehicle trailing second vehicle 202 in the directly adjacent left line is traveling slowly. As described above, a future position of second vehicle 202 may be associated with second blind spot zone A-1+A-2 when second vehicle 202 is traveling quickly and/or the closest vehicle trailing second vehicle 202 in the directly adjacent left line is traveling quickly. Second blind spot zone A-1+A-2 thus represents a blind spot zone with an expanded or increased area and/or dimension.

At 201c, first vehicle 201 is predicted to occupy left blind spot zone 251c. Thus, host vehicle 200 determines whether second vehicle 202 is connected. If second vehicle 202 is connected, then host vehicle 200 transmits display instructions to second vehicle 202. If second vehicle 202 is not connected, then host vehicle 200 transmits display instructions to sixth vehicle 206 and command sixth vehicle 206 to proxy for second vehicle 202 (e.g., by flashing tail lights in a specific pattern).

The invention claimed is:

1. A vehicle comprising:
motor(s), sensors, processor(s) configured to:
iterate a series of future properties, comprising future positions, of nearby first and second vehicles based on determined current properties thereof;
associate a blindspot with an iterated future position of the second vehicle;
responsive to a future position of the first vehicle occupying the blindspot,
transmit a message to the second vehicle;
adjust a dimension of the blindspot based on a future property of the first vehicle.

2. A host vehicle comprising:
motor(s), sensors, processor(s) configured to:
iterate a series of future properties, comprising future positions, of nearby first and second vehicles based on determined current properties thereof;
associate a blindspot with an iterated future position of the second vehicle;
determine whether a future position of the first vehicle occupies the blindspot;
if so, transmit a message to the second vehicle including a predicted occupation time;
adjust a dimension of the blindspot based on a future property of the first and second vehicle.

3. A host vehicle comprising:
motor(s), sensors, processor(s) configured to:
iterate a series of future properties, comprising future positions, of nearby first and second vehicles based on determined current properties thereof;
associate a blindspot with an iterated future position of the second vehicle;
determine whether a future position of the first vehicle occupies the blindspot;
if so, transmit a message to the second vehicle including a predicted occupation time,
wherein the blindspot is associated with a third iterated future position of the second vehicle;
adjust a dimension of the blindspot based on a future property of the first vehicle at a second iterated future position of the first vehicle.

4. A host vehicle comprising:
motor(s), sensors, processor(s) configured to:
iterate a series of future properties, comprising future positions, of nearby first and second vehicles based on determined current properties thereof;
associate a first blindspot with an iterated future position of the second vehicle;
determine whether a future position of the first vehicle occupies the first blindspot;
if so, transmit a message to the second vehicle including a predicted occupation time;
associate a second, different blindspot with the iterated future position of the second vehicle.

5. The host vehicle of claim 4, wherein the processor(s) are configured to: adjust a dimension of the first blindspot, but not the second blindspot, based on a future property of the first vehicle.

6. A host vehicle comprising:
motor(s), sensors, processor(s) configured to:
iterate a series of future properties, comprising future positions, of nearby first and second vehicles based on determined current properties thereof;
associate a blindspot with an iterated future position of the second vehicle;
determine whether a future position of the first vehicle occupies the blindspot;
if so, transmit a message to the second vehicle including a predicted occupation time;
generate the predicted occupation time based on a future time when the first vehicle is predicted to occupy the blindspot.

7. The host vehicle of claim 6, wherein the processor(s) are configured to: generate the predicted occupation time based on the future time by subtracting a predetermined amount from the future time.

8. The host vehicle of claim 7, wherein the processor(s) are configured to:
calculate the subtracted predetermined amount based on a future property of the first vehicle.

9. The host vehicle of claim 8, wherein the future property of the first vehicle is a predicted speed of the first vehicle during an iteration preceding the iteration where the first vehicle occupies the blindspot.

10. A method of controlling a host vehicle, the host vehicle comprising motor(s), sensors, processor(s), the method comprising, via the processor(s):
iterating a series of future properties, comprising future positions, of nearby first and second vehicles based on determined current properties thereof;
associating a blindspot with an iterated future position of the second vehicle;
determining whether a future position of the first vehicle occupies the blindspot;
if so, transmitting a message to the second vehicle including a predicted occupation time;
adjusting a dimension of the blindspot based on a future property of the first vehicle.

11. A method of controlling a host vehicle, the host vehicle comprising motor(s), sensors, processor(s), the method comprising, via the processor(s):
iterating a series of future properties, comprising future positions, of nearby first and second vehicles based on determined current properties thereof;
associating a blindspot with an iterated future position of the second vehicle;
determining whether a future position of the first vehicle occupies the blindspot;
if so, transmitting a message to the second vehicle including a predicted occupation time;
adjusting a dimension of the blindspot based on a future property of the first and a future property of the second vehicle.

12. A method of controlling a host vehicle, the host vehicle comprising motor(s), sensors, processor(s), the method comprising, via the processor(s):
iterating a series of future properties, comprising future positions, of nearby first and second vehicles based on determined current properties thereof;
associating a blindspot with an iterated future position of the second vehicle;
determining whether a future position of the first vehicle occupies the blindspot;
if so, transmitting a message to the second vehicle including a predicted occupation time, wherein the blindspot is associated with a third iterated future position of the second vehicle;
adjusting a dimension of the blindspot based on a future property of the first vehicle at a second iterated future position of the first vehicle.

13. A method of controlling a host vehicle, the host vehicle comprising motor(s), sensors, processor(s), the method comprising, via the processor(s):
iterating a series of future properties, comprising future positions, of nearby first and second vehicles based on determined current properties thereof;
associating a first blindspot with an iterated future position of the second vehicle;
determining whether a future position of the first vehicle occupies the first blindspot;
if so, transmitting a message to the second vehicle including a predicted occupation time;
associating a second, different blindspot with the iterated future position of the second vehicle.

14. The method of claim 13, comprising adjusting a dimension of the first blindspot, but not the second blindspot, based on a future property of the first vehicle.

15. A method of controlling a host vehicle, the host vehicle comprising motor(s), sensors, processor(s), the method comprising, via the processor(s):
iterating a series of future properties, comprising future positions, of nearby first and second vehicles based on determined current properties thereof;
associating a blindspot with an iterated future position of the second vehicle;
determining whether a future position of the first vehicle occupies the blindspot;
if so, transmitting a message to the second vehicle including a predicted occupation time;
generating the predicted occupation time based on a future time when the first vehicle is predicted to occupy the blindspot.

16. The method of claim 15, comprising generating the predicted occupation time based on the future time by subtracting a predetermined amount from the future time.

17. The method of claim 16, comprising calculating the subtracted predetermined amount based on a future property of the first vehicle.

18. The method of claim 17, wherein the future property of the first vehicle is a predicted speed of the first vehicle during an iteration preceding the iteration where the first vehicle occupies the blindspot.

* * * * *